(12) United States Patent
Elford et al.

(10) Patent No.: US 9,575,561 B2
(45) Date of Patent: Feb. 21, 2017

(54) METHOD, APPARATUS AND SYSTEM FOR INTERACTING WITH CONTENT ON WEB BROWSERS

(75) Inventors: Christopher L. Elford, Hillsboro, OR (US); Howard P. Tsoi, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 696 days.

(21) Appl. No.: 12/978,082

(22) Filed: Dec. 23, 2010

(65) Prior Publication Data

US 2012/0166974 A1 Jun. 28, 2012

(51) Int. Cl.
*G06F 3/01* (2006.01)
*G06F 3/0481* (2013.01)
*G06F 17/30* (2006.01)
*G06F 3/0484* (2013.01)

(52) U.S. Cl.
CPC ............ *G06F 3/017* (2013.01); *G06F 3/0481* (2013.01); *G06F 3/04842* (2013.01); *G06F 17/30861* (2013.01)

(58) Field of Classification Search
CPC ................................ G06F 3/017; G06F 3/0481
USPC ................... 715/760, 815, 206, 249
See application file for complete search history.

(56) References Cited

U.S. PATENT DOCUMENTS

| 7,848,542 | B2 | 12/2010 | Hildreth |
| 7,975,020 | B1* | 7/2011 | Green et al. ............ 709/217 |
| 2004/0205568 | A1* | 10/2004 | Breuel et al. ............ 715/513 |
| 2005/0050024 | A1 | 3/2005 | Ellis et al. |
| 2006/0010400 | A1 | 1/2006 | Dehlin et al. |
| 2009/0044098 | A1* | 2/2009 | Wyler et al. ............ 715/234 |
| 2009/0217211 | A1* | 8/2009 | Hildreth et al. ............ 715/863 |
| 2009/0228841 | A1 | 9/2009 | Hildreth |
| 2010/0107054 | A1* | 4/2010 | Park ............ 715/234 |
| 2010/0251189 | A1* | 9/2010 | Jaeger ............ 715/863 |
| 2011/0078557 | A1* | 3/2011 | Seolas et al. ............ 715/234 |
| 2011/0113346 | A1* | 5/2011 | O'Shaugnessy et al. ..... 715/752 |
| 2012/0151420 | A1* | 6/2012 | Amento et al. ............ 715/863 |
| 2012/0311470 | A1 | 12/2012 | Roberts et al. |
| 2013/0254646 | A1 | 9/2013 | Amacker et al. |
| 2013/0254647 | A1 | 9/2013 | Amacker et al. |
| 2013/0254648 | A1 | 9/2013 | Amacker et al. |

FOREIGN PATENT DOCUMENTS

| CN | 101901050 A | 12/2010 |
| EP | 1 394 692 A1 | 3/2004 |
| EP | 1615109 A2 | 1/2006 |
| EP | 2244166 A2 | 10/2010 |

(Continued)

OTHER PUBLICATIONS

Firebug: Web Development Evolved, obtained at: <http://getfirebug.com> obtained on Dec. 17, 2010, 4 pages.

(Continued)

*Primary Examiner* — William Bashore
*Assistant Examiner* — Jeanette J Parker
(74) *Attorney, Agent, or Firm* — Schwabe Williamson & Wyatt PC

(57) ABSTRACT

A method, apparatus and system enable indirect remote interaction with a web browser. In one embodiment, remote user gestures may be captured and processed to determine an action to be taken by the web browser.

19 Claims, 14 Drawing Sheets

(56) References Cited

FOREIGN PATENT DOCUMENTS

| JP | 2006-40271 A | 2/2006 |
| KR | 10-2010-0045868 | 5/2010 |
| KR | 100978929 B1 | 8/2010 |
| TW | 200511050 A | 3/2005 |
| TW | 201007510 A | 2/2010 |
| WO | WO2009/142866 A1 | 11/2009 |

OTHER PUBLICATIONS

CES 2010 Demo Lenovo ideapad S10 3T Multi-touch Netbook(Net Books Point: A Complete Store for Notebooks), obtained at: <http://www.netbookspoint.com/netbooks/lenovo-netbook/ces-2010-demo-lenovo-ideapad-s10-3t-multi-touch-netbook.html> obtained on Dec. 17, 2010, 6 pages.

Introducing Kinect for Xbox 360, obtained at <http://www.xbox.com/en-US/kinect?WT.srch=>, obtained on Dec. 21, 2010, 4 pages.

Engleman, Eric, "Making online orders with a nod or a smile? Bezos seeks patent", TechFlash, Seattle's Technology News Source, obtained at: <http://www.techflash.com/seattle/2010/06/making_online_orders_with_a_nod_or_a_smile_bezos_seeks_patent.html> obtained on Dec. 17, 2010, 2 pages.

The RedEye Turns Any iPhone or iPod Touch Into a Unverisal Remote Control, Wikio News, obtained at <http://www.wikio.com/video/redeye-accelerometer-gestures-2228995> obtained on Dec. 17, 2010, 1 page.

Anthony, Sebastian, "Control Firefox with a Nintendo Wiimote", Apr. 15, 2010, available at: <http://downloadsquad.switched.com/2010/04/15/control-firefox-with-a-nintendo-wiimote>, 1 page.

GestureTek, "About Us", available at: <http://www.gesturetek.com/aboutus/corporatebackground.php>, obtained on Dec. 17, 2010, 2 pages.

http://www.nintendo.com/wii, obtained on Dec. 21, 2010, 2 pages.

International Search Report and Written Open mailed Aug. 17, 2012 in PCT Application No. PCT/US2011/067211, 9 pages.

Translation of Office Action mailed May 8, 2014 for Korean Application No. 10-2013-7016203, 4 pages.

International Preliminary Report on Patentability, mailed Jul. 4, 2013 for International Application No. PCT/US2011/067211, 6 pages.

Office Action mailed Feb. 4, 2014 for Japanese Application No. 2013-544884, 5 pages.

Taiwan Search Report mailed May 28, 2014 for Taiwan Patent Application No. 100147988, 18 pages.

Taiwan Office Action mailed Apr. 1, 2015 for Taiwan Patent Application No. 100147988, 5 pages.

Chinese Office Action mailed Mar. 29, 2015 for Chinese Application No. 201180061879.5, 8 pages.

Extended European Search Report mailed Sep. 29, 2016 for European Patent Application No. 11852170.7, 10 pages.

J Vanderdonckt: "Multimodality for Plastic User Interfaces Models Methods and Principles," Multimodal User Interfaces, Jan. 1, 2008, Berlin, Heidelberg, 24 pages.

* cited by examiner

GESTURE MAPPING IN GESTURE LIBRARY —125

CLOSE TAB

WEB SEARCH

STOP

FOLLOW LINK

BACK

TOP

BOTTOM

BOOKMARK

"ROTATE BACK" CLOSE TAB

"SWING" FORWARD OR BACK

"HIGH SWIVEL" WEB SEARCH

```
<BODY scroll="yes" onload="javascript:if(typeof(_spBodyOnLoadWrapper)!='undefined') _spBodyOnLoadWrapper();">
<form name="aspnetForm" method="post" action="default.aspx?InstanceID=3" onsubmit="javascript:return WebForm_OnSubmit();" id="aspnetForm">
<div>
<input type="hidden" name="MSO_PageHashCode" id="MSO_PageHashCode" value="11927049987" />
<input type="hidden" name="MSOWebPartPage_PostbackSource" id="MSOWebPartPage_PostbackSource" value="" />
<input type="hidden" name="MSOTIPn_SelectedWpId" id="MSOTIPn_SelectedWpId" value="" />
<input type="hidden" name="MSOTIPn_View" id="MSOTIPn_View" value="0" />
<input type="hidden" name="MSOTIPn_ShowSettings" id="MSOTIPn_ShowSettings" value="False" />
<input type="hidden" name="MSOGallery_SelectedLibrary" id="MSOGallery_SelectedLibrary" value="" />
<input type="hidden" name="MSOGallery_FilterString" id="MSOGallery_FilterString" value="" />
<input type="hidden" name="MSOTIPn_Button" id="MSOTIPn_Button" value="none" />
<input type="hidden" name="__EVENTTARGET" id="__EVENTTARGET" value="" />
<input type="hidden" name="__EVENTARGUMENT" id="__EVENTARGUMENT" value="" />
<input type="hidden" name="__REQUESTDIGEST" id="__REQUESTDIGEST" value="Jun 2010 18:05:45 -0000" />
<input type="hidden" name="MSOSPWebPartManager_DisplayModeName" id="MSOSPWebPartManager_DisplayModeName" value="Browse" />
<input type="hidden" name="MSOWebPartPage_Shared" id="MSOWebPartPage_Shared" value="" />
<input type="hidden" name="MSOLayout_LayoutChanges" id="MSOLayout_LayoutChanges" value="" />
<input type="hidden" name="MSOLayout_InDesignMode" id="MSOLayout_InDesignMode" value="" />
<input type="hidden" name="MSOSPWebPartManager_OldDisplayModeName" id="MSOSPWebPartManager_OldDisplayModeName" value="Browse" />
<input type="hidden" name="MSOSPWebPartManager_StartWebPartEditingName" id="MSOSPWebPartManager_StartWebPartEditingName" value="false" />
<input type="hidden" name="__VIEWSTATE" id="__VIEWSTATE" value="__VIEWSTATE"
```

CODE — 500

CODE ANALYZER — 505

| TABLE | HOTSPOT # | ACTION | TYPE OF ACTION | TAG |
|---|---|---|---|---|
| 510 | 1 | x | FLOATOVER | <ID=XYZ> |
| | 2 | y | FLOATOVER | |
| | 3 | z | | |

METHOD, APPARATUS AND SYSTEM FOR INTERACTING WITH CONTENT ON WEB BROWSERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Personal computing technology and cellular telephone devices have changed radically over the past 10 years. Personal computing (PC) devices have become increasingly popular, quickly evolving into ever smaller form factors such as netbooks and tablets, with increased computing power. Simultaneously, the cellular telephone market has evolved into a personal information management device that includes email, texting and camera capabilities, rather than simply a voice communications device. As a result, both larger and smaller PC devices have become essential to consumers to conduct their day to day lives.

As these devices continue to proliferate the market and consumers become increasingly savvy, it has become evident that traditional PC-centric input schemes and PC-centric user interfaces are increasingly posing obstacles to a richer end user experience. As used herein, the phrase "PC-centric" refers to traditional PC-based platforms having a mouse, pen, touch screen or other such existing interfaces. Users are just as likely to want to utilize an application on a handheld smart phone or MID as a traditional PC-centric devices, thus posing a number of different challenges for application developers. Applications designed for larger footprint PCs, for example, have difficulty running (if they are able to run at all) on smaller form factors with lower computing power. For example, largely due to the form factor, mobile device applications typically have reduced and/or different functionality than similar applications available to PC-centric devices (e.g., devices with large screens, a mouse or other such device that controls a cursor on the screen, etc.). Handheld device application features are frequently "dumbed down" or condensed for handheld device, typically with reduced functionality.

The most common example of such an altered application is the typical web browser that runs on a hand held device. These browsers typically provide limited browsing ability because they are based on a PC-centric paradigm of utilizing an input device such as a keyboard, mouse, trackball and/or trackpad/touchpad, where a "cursor" (text or pointer) is moved around the screen. Alternatively, the current paradigm may accept touch screen input where a user may utilize a finger or a pen to provide input to the device. Touch screen technology was also designed within a PC-centric environment and as such, typically relies on a variety of PC-centric functionality. Without these types of PC-centric input devices, however, developers for browsers that run on handheld devices may be forced to adapt their application for hand held devices (typically by providing reduced functionality).

In addition to the functionality, the fundamental user interface of a PC-centric application may also have to be modified or redesigned in order to take into account the limited screen real estate and other limitations on handheld device. Referring back to the browser example, although the user interface of a browser on a handheld device may resemble the original browser on which it is based on a PC-centric platform, the handheld interface is typically simplified to compensate for the limitations of the handheld device. This factor, together with the significantly limited input schemes available on handheld devices, are quickly rendering existing PC-centric user interaction paradigms obsolete.

BRIEF DESCRIPTION OF THE DRAWINGS

The present invention is illustrated by way of example and not limitation in the figures of the accompanying drawings in which like references indicate similar elements, and in which:

FIG. 5A-5C illustrate an embodiment of the present invention;

FIGS. 6A-6C illustrate an embodiment of the present invention;

DETAILED DESCRIPTION

Figure 1:
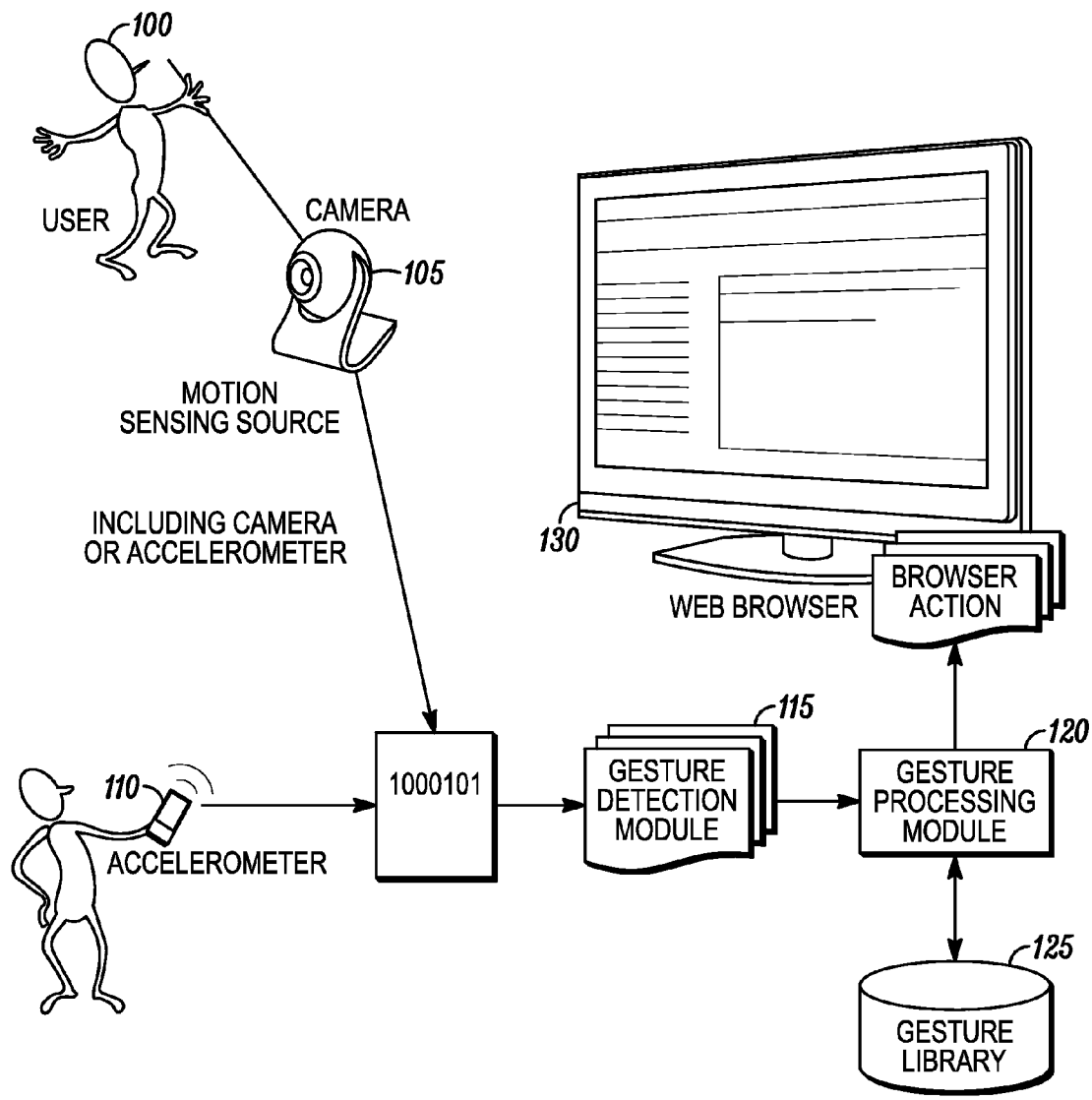
FIG. 1 illustrates an embodiment of the present invention.

Embodiments of the present invention provide users with a new paradigm for manipulating web browsers that is independent of traditional elements such as input devices and cursors. More specifically, embodiments of the present invention provide a method, apparatus and system for interacting with content on web browsers with gestures, without a need for traditional input devices and/or touch screens. "Gestures" as used herein refers to a variety of operations, including but not limited to movements of hands, eyes and/or another body part. For the purpose of simplicity, many of the examples herein may utilize hand gestures but embodiments of the invention are not so limited. As used in this specification, the phrases "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Additionally, reference in the specification to the term "device", "machine" or "apparatus" may include any one of a number of single or multi-processor based computing devices, including but not limited to servers, desktop computing devices, portable computing devices (including laptops, notebooks, netbooks and handhelds), set-top boxes, and game consoles. Handheld devices may include, but are not limited to, cell phones, smart phones, personal digital assistants (PDAs), mobile internet devices (MIDs), laptops, digital cameras, media players, ultra mobile personal computers (UMPCs) and/or any computing device that is capable of roaming on, and connecting to, a network.

Embodiments of the present invention enable users to enjoy a customized interactive experience with web browsers, regardless of platform or size. More specifically, embodiments of the present invention enable users to interact with web browsers utilizing gestures, independent of external physical input devices as well as independent of the need for physical touch on an input screen or display device. Embodiments of the invention may be adapted for implementation on a variety of platforms without departing from the spirit of the invention.

According to one embodiment of the invention, users may perform web browsing actions by utilizing gestures. In one embodiment, a gesture input scheme may comprise a motion sensing source comprising at least one of an accelerometer and a camera, a gesture detection module and a gesture processing module. The motion sensing source, gesture detection module and gesture processing module may be implemented as separate components and/or be combined in a variety of ways without departing from the spirit of embodiments of the present invention. Thus, for example, in one embodiment, the motion sensing source may be combined with the gesture detection module into a single component. In an alternate embodiment, gesture detection module and gesture processing module may be combined into a single component. For the purposes of simplicity, the following descriptions discuss the functionality of each module separately. In various embodiments, the functionality of the modules remains the same, regardless of how they are combined (or not) for implementation.

The motion sensing source may identify a motion made by a user (e.g., a hand motion, an eye motion, body motion, etc.) and capture the motion data. The gesture detection module may thereafter determine that the motion data relates to a specific movement and is not a motion event to be passed on to the platform. In other words, the gesture detection module determines that this is a gesture to provide input to the device rather than simply a movement of the device. This movement may be provided to the gesture processing module, which in turn may translate the movement to determine the action that the user is attempting to perform within the web browser.

Various motion detection technologies exist today and may be utilized with embodiments of the present invention without departing from the spirit of the invention. Examples of such motion detection technologies are frequently used in game platforms. For example, Nintendo Corporation's WII game platform includes accelerometers in the WII's remote control. The accelerometer in the WII's-remote control identities the motion, the direction of the motion and rate information, which coupled with a transceiver on the base WII unit, enable a user's actions to be mimicked on the screen. Similarly, Microsoft Corporation's recent release of the KINECT utilizes a camera to detect user motion that is then replicated within the game. There are also various other non-game products from companies such as GestureTek that take advantage of camera-enabled gesture-recognition technology for a variety of uses.

Embodiments of the present invention leverage these existing motion detection technologies to provide an enhanced motion based input scheme for web browsing. Specifically, embodiments of the present invention utilize a camera and/or accelerometer or both to sense and capture gestures, confirm that the gestures are intended as input to a web browser, and translate the gestures into an indicator of specific actions that the user desires to take on a web browser. Thus, for example, in one example, a user may perform a full hand grab motion to zoom into a screen region of a web browser. According to this embodiment, a camera and accelerometer (together comprising a motion sensing source) may provide a data stream of the action to a component that is doing gesture detection (gesture detection module).

In one embodiment, the gesture detection module may be a component of the operating system on the platform and may identify that the movement is not a motion event recognized by the operating system. The gesture detection module may thereafter determine that the motion is intended as a gesture for input to the web browser and provide the motion to the gesture processing module. The gesture processing module may then translate the motion into an action understandable by a web browser component and inform the browser of the action. In one embodiment, this process of translation may utilize a gesture library that correlates a specific gesture to a particular browser action. Once translated to the appropriate browser action and sent to the browser, the browser may perform the action intended by the user.

In the present example, the camera may capture the full hand grab and stream it to the gesture detection module. The gesture detection module may receive the motion of the full hand grab from the data stream and determine that it is intended as input. The gesture detection module may then inform the gesture processing module that the motion is a full hand grab. The gesture processing module may thereafter determine what action the full hand grab motion translates to by examining a repository of gestures and upon determining that it is a "zoom" request, inform the browser to zoom to the appropriate region on the web browser screen. The web browser may then follow through with the zoom and provide the user with the end result they desired.

FIG. 1 illustrates an example of an embodiment of the present invention. As illustrated, a user may perform a motion. A motion sensing source (Camera 105 and Accelerometer 110 collectively) coupled to a computing platform (Computing Platform 100), may identify and capture the full hand grab motion and provide a motion data stream of the action to Gesture Detection Module 115. Gesture Detection Module 115 may examine the motion and confirm that it is not a motion event to be passed on to the operating system on Computing Platform 100. Gesture Detection Module 115 may then determine that the motion is a gesture meant as input to the web browser and Gesture Detection Module 115 may then provide that information to Gesture Processing Module 120.

Upon receipt of the gesture information from Gesture Detection Module 115, Gesture Processing Module 120 may examine the gesture information and process the information against a translation store (Gesture Library 125). In one embodiment of the invention, the translation store includes a mapping of different user gestures and specific actions to be performed on a web browser. In this example, Gesture Processing Module 120 may determine that the full hand grab motion translates to a "zoom" request from the user. Gesture Processing Module 120 may thereafter send Web Browser 130 a request to zoom per the user's request.

According to an embodiment of the invention, Gesture Detection Module 115 may be implemented as an extension of the operating system running on Computing Platform 100, but embodiments of the invention are not so limited.

Similarly, Gesture Processing Module 120 may be implemented as an extension of Web Browser 130 but embodiments of the invention are not so limited. In alternate embodiments, Gesture Processing Module 120 may be an independent module couple to Web Browser 130.

Figure 2:
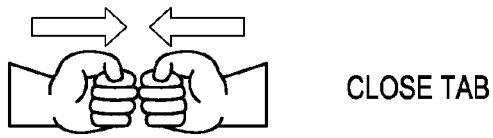
FIG. 2 illustrates a set of information in a translation store according to an embodiment of the present invention.
Figure 2:
Figure 2:
Figure 2:
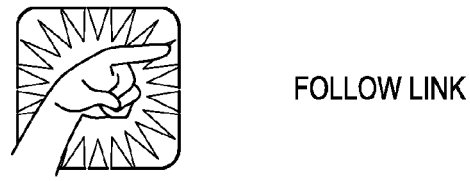
Figure 2:
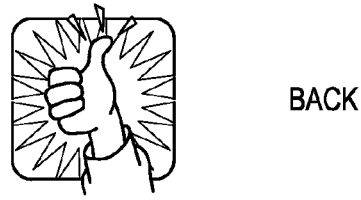
Figure 2:
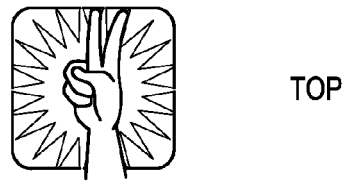
Figure 2:
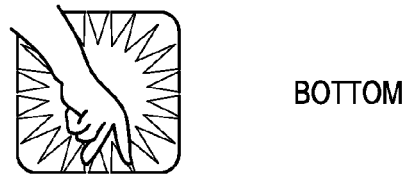
Figure 2:
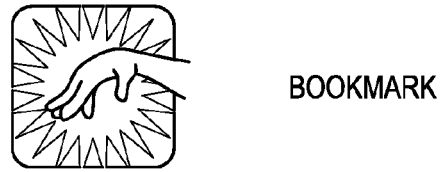

FIG. 2 illustrates an example of information stored in Gesture Library 125 according to embodiments of the present invention. More specifically, FIG. 2 illustrates various actions that may be translated by the Gesture Processing Module. For example, per the description of FIG. 1 above, if the user gestures both fists coming together, the movement may be captured by Camera 105 and Accelerometer 110, provided to Gesture Detection Module 115 to identify the motion as a gesture, then relayed to Gesture Processing Module 120, Gesture Processing Module 120 may compare the gesture against a list of gestures in Gesture Library 125. As illustrated in FIG. 2, Gesture Processing Module 120 may examine Gesture Library 125 and determine that the user's motion (both fists coming together) translates to a request to "close tab", Gesture Processing Module 120 may replace the gesture with the instruction to close a tab and provide the instruction to Web Browser 130.

Figure 3:
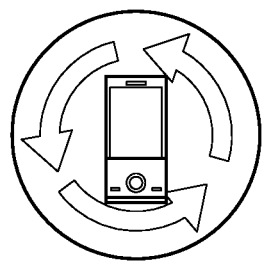
FIG. 3 is illustrates an alternate set of information in a translation store according to an embodiment of the present invention.
Figure 3:
Figure 3:
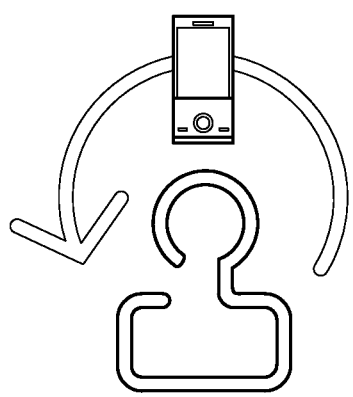

Similarly, FIG. 3 illustrates further examples of information in Gesture Library 125. In this example, a variety of actions detected by a camera and an accelerometer may be translated into gestures. Thus, if the user performs a swinging action that is detected by Accelerometer 110, the action may ultimately be passed on to Web Browser 125 as a request to page forward or backward, depending on the direction the user is swinging. In various embodiments of the invention, the list of gestures and translated action requests to Web Browser 125 may be a list which may be dynamically updated, either automatically according to predetermined criteria or manually, by application developers.

In addition to a gesture based input scheme for the new paradigm for manipulating web browsers, embodiments of the present invention additionally identify and expose a variety of possible actions within a web browser. Typical web pages viewed within a traditional PC-centric environment assume the presence of a mouse. Thus, for example, web pages often include "actionable areas" that are not immediately obvious to the user until the user performs an action within the area (e.g., hovers a mouse over the area). Once the web page detects the mouse hover, it may then display hidden text or actions that may be available to the user.

Figure 4:
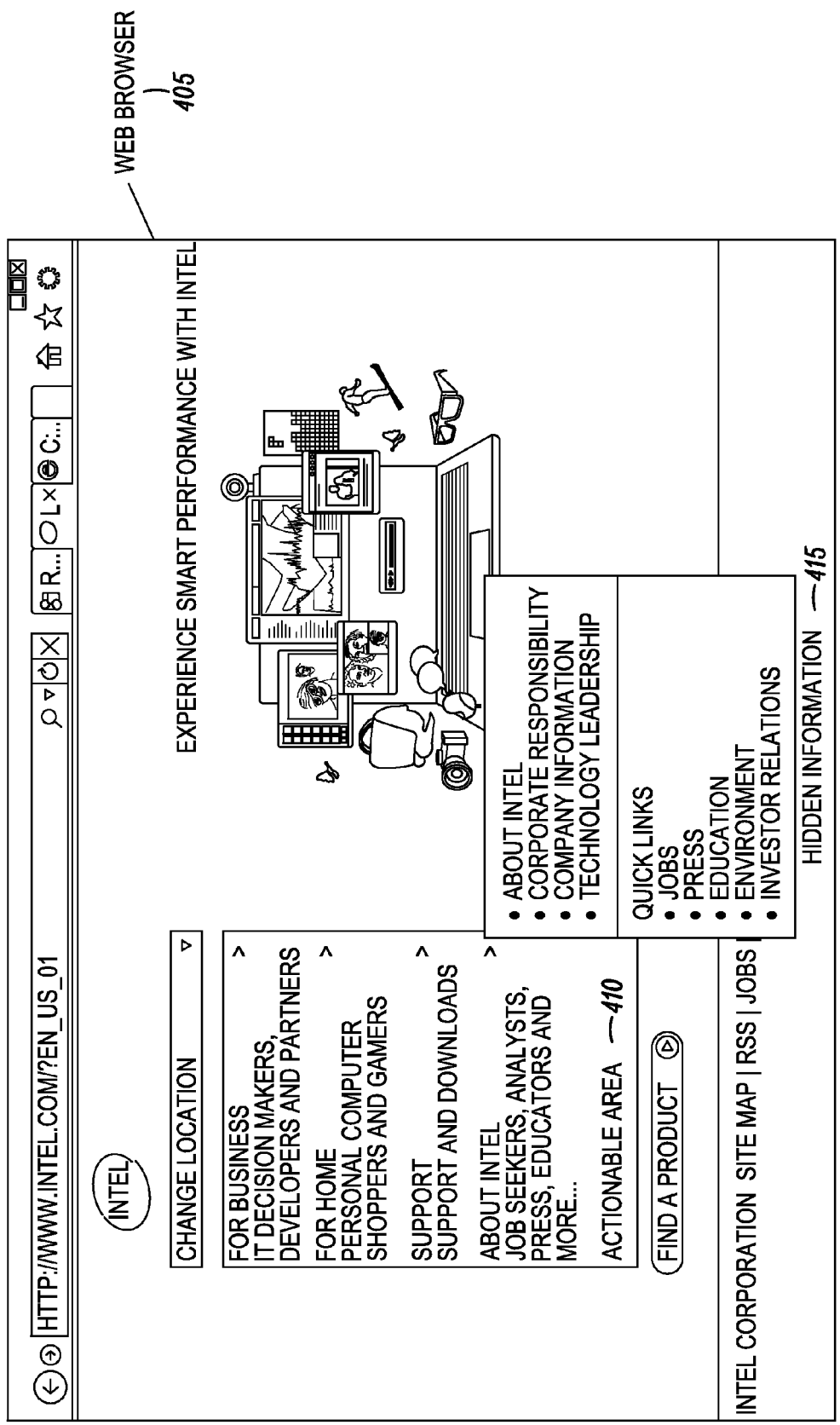
FIG. 4 illustrates an embodiment of the present invention.

FIG. 4 illustrates an example of one embodiment of the invention. As illustrated, applications ("Application 400") developed for traditional PC-centric web browsers ("Web Browsers 405") often employ a convention whereby when the positioning cursor is placed over an actionable area ("Actionable Area 410") of the graphical interface for a predetermined period of time, Application 400 may respond by displaying additional text (Hidden Text 415) that provides information pertaining to or related to the area. Thus, within this environment, once the user sees the hidden information revealed, the user may select one of the additional instructions for execution (e.g., by clicking on the "Corporate Responsibility" link revealed within Hidden Information 415, the user may be directed to a new web page.

On smaller form factor devices (e.g., MIDs), however, this type of functionality is typically not available. On touch based devices, for example, the lack of a positioning curser impedes the use of this technique. Even on handheld devices with input devices (e.g., a wand style TV remote), users have difficulty precisely positioning and holding a pointer on specific spots. As a result, web browser applications running on these platforms typically do not include this "actionable area" functionality.

According to embodiments of the present invention, web applications may provide the same functionality on all platforms. Embodiments of the present invention enable a new paradigm that exposes to a user one or more graphical user interface constructs that would otherwise be hard to identify and/or act upon on some device types. More specifically, instead of relying on the use of a positioning cursor to hover over actionable areas, one embodiment of the present invention may identify all actionable regions of Application 400 and provide a set of visual cues ("Visual Cues 415") that may be visible regardless of which platform Application 400 is running on. Visual Cues 415 may be customized for each platform, thus providing users with a significantly new and improved user interaction experience.

Figure 5B:
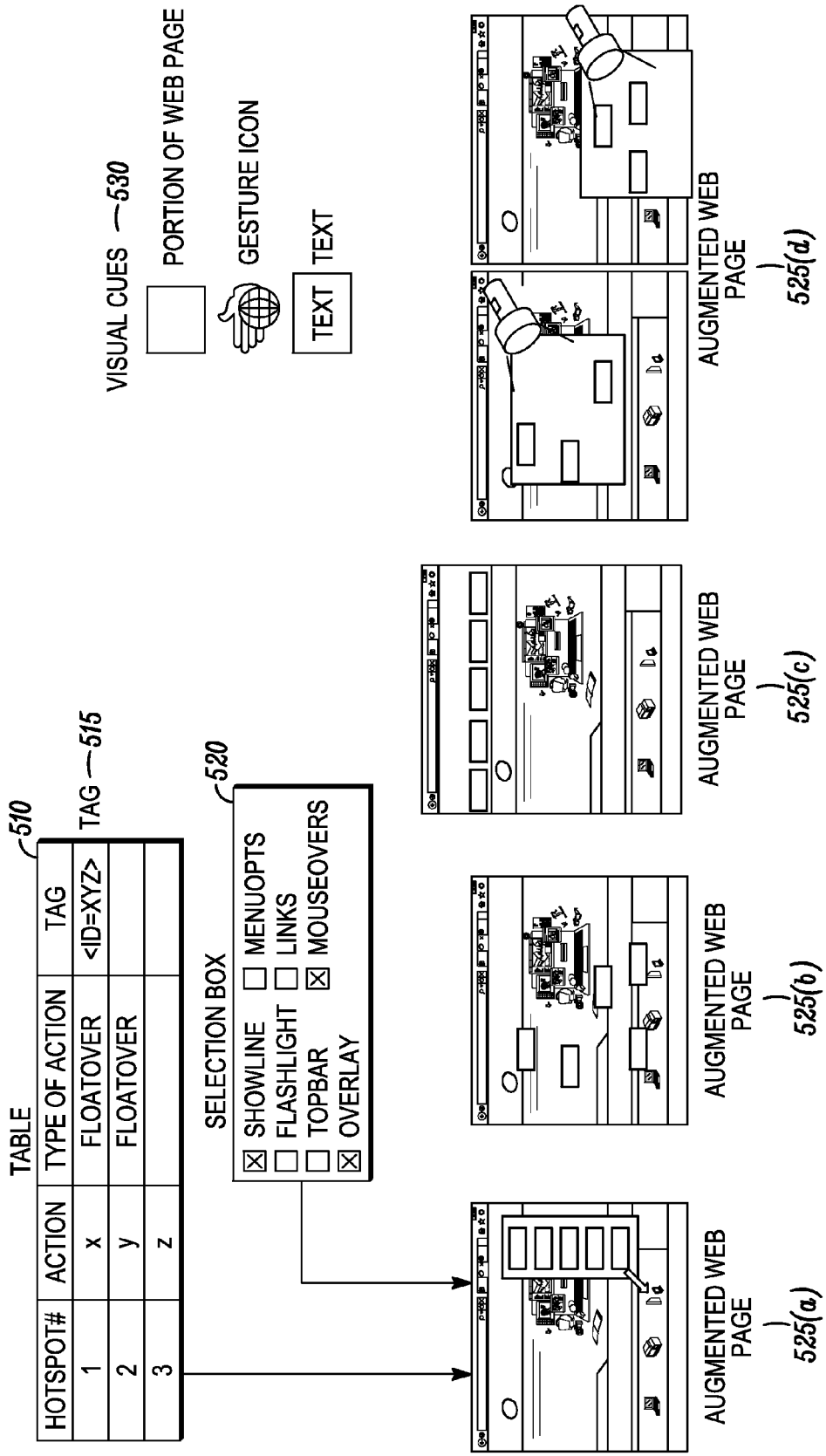
Figure 5C:
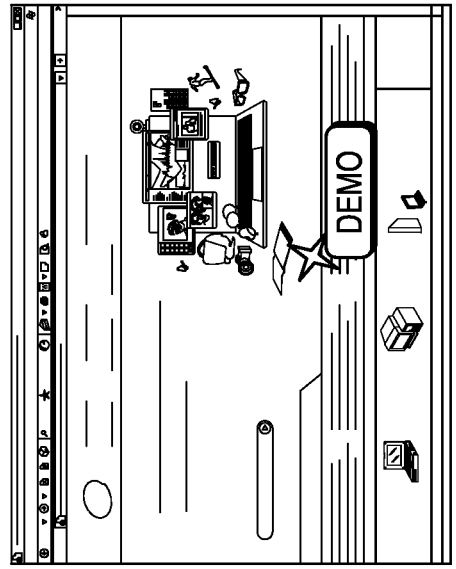
Figure 5C:
Figure 5C:
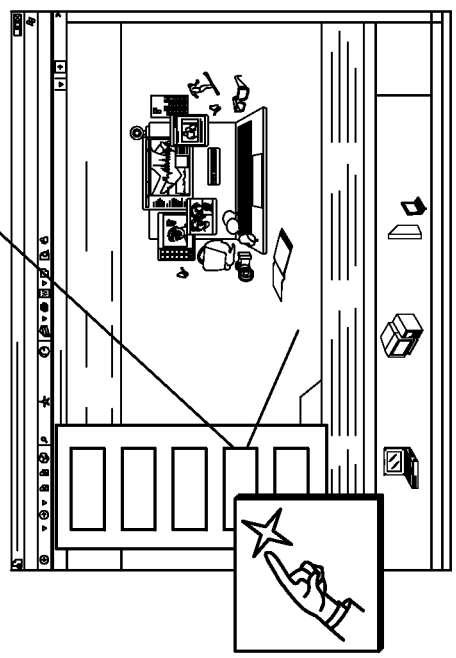

FIGS. 5A-5C illustrate an embodiment of the invention wherein visual cues may be used to further enhance the new paradigm for interacting with web browsers. For the purposes of this example, the user is assumed to be on a phone but embodiments of the invention may be implemented on a variety of devices as previously discussed. As illustrated in FIG. 5A, upon receipt of a web page (e.g., the Application 400 illustrated in FIG. 4) on a phone, the code for the web page (Code 500) may be parsed to Code Analyzer Module 500 which may determine that the web page includes actionable areas. It is well known in the art that web pages today are typically written in HTML (HyperText Markup Language), XHTML (eXtensible HyperText Markup Language) and/or XML (Extensible Markup Language). Web browsers typically rely on web layout engines (e.g., Trident/MSHTML for the Microsoft Internet Explorer browser) to parse the language into a DOM. The DOM is a cross-platform and language-independent convention for representing and interacting with objects in HTML, XHTML and XML documents. Although described herein with respect to existing languages and conventions, embodiments of the invention are not so limited. It will be apparent to those of ordinary skill in the art that later developed web markup languages and/or conventions may be easily adapted to implement embodiments of the present invention.

Tags on a web page may be used by the DOM to determine the location of various items on a webpage (relative to other items). Thus, as illustrated, once Code Analyzer 505 identifies actionable areas on a web page, the information about the actionable areas may be consolidated. An example of the type of information collected and consolidated is illustrated in Table 510. Specifically, in this example, Code Analyzer 505 may identify 3 different actions (X, Y and Z), each corresponding to a specific action (e.g., "floatovers" as shown) and a tag for each action (e.g., <id=xyz> as illustrated). The term "floatover" as used in this example may be referred to by other terminology such as hover, mouse hover, mouse over etc.

Once the actionable areas are identified as shown in FIG. 5A, FIG. 5B illustrates how embodiments of the present invention may present visual cues to a user. Specifically, as illustrated, in one embodiment, upon detecting that actionable areas exist on a web page, a user selection box (Selection Box 520) may be displayed. The user may select the types of actionable areas that he/she wishes to view. In one embodiment, the user may additionally utilize gestures to specify the types of actionable areas to select. According to this embodiment of the present invention, a user may not only provide input to the web application via gestures as previously described, it may additionally identify actionable areas within a web browser application without direct interaction. Thus, for example, each of the types of actionable items may be associated with a number and by holding up five fingers, for example, embodiments of the present invention may utilize that gesture to "select" the item associated with the number 5.

The selected types of actionable areas may then be displayed on Augmented Web Page 525 in a variety of ways. Various examples of Augmented Web Page 525 are illustrated here as Augmented Web page 525 (*a*)-(*d*) but embodiments of the invention are not so limited. Augmented Web Page 525 (*a*), for example, may include an overlay listing in the form of a side menu of all the action items available to the user within Actionable Area 410. Alternatively, these items may be displayed in a variety of other ways without departing from the spirit of embodiments of the invention.

The actual display of the menu items and/or displayed actions may be any type of visual cue (Visual Cues 530) that is appropriate for the device on which the user is reading the web page. In this example of a phone, given the small display screen, Visual Cue 510 may be represented by text for a link. Alternatively, the user may be presented with an icon indicative of a gesture the user may use to activate the link. In yet another embodiment, the user may simply be presented with a portion of the web page that is active and available for selection.

According to an embodiment of the invention, once the user is able to view Visual Cues 510 and realizes that there is are selectable, actionable areas on the page, the user may select Visual Cue 510 as illustrated in FIG. 5C. In one embodiment of the invention, the user may utilize a gesture (e.g., index finger pointed forward, indicating "select link") to follow a link. As previously discussed, this gesture may be captured, identified and processed and the user's input may then be routed to the web browser's user interface as input. The user may then be presented with a demo of a product (as specified by the link).

Figure 6A:
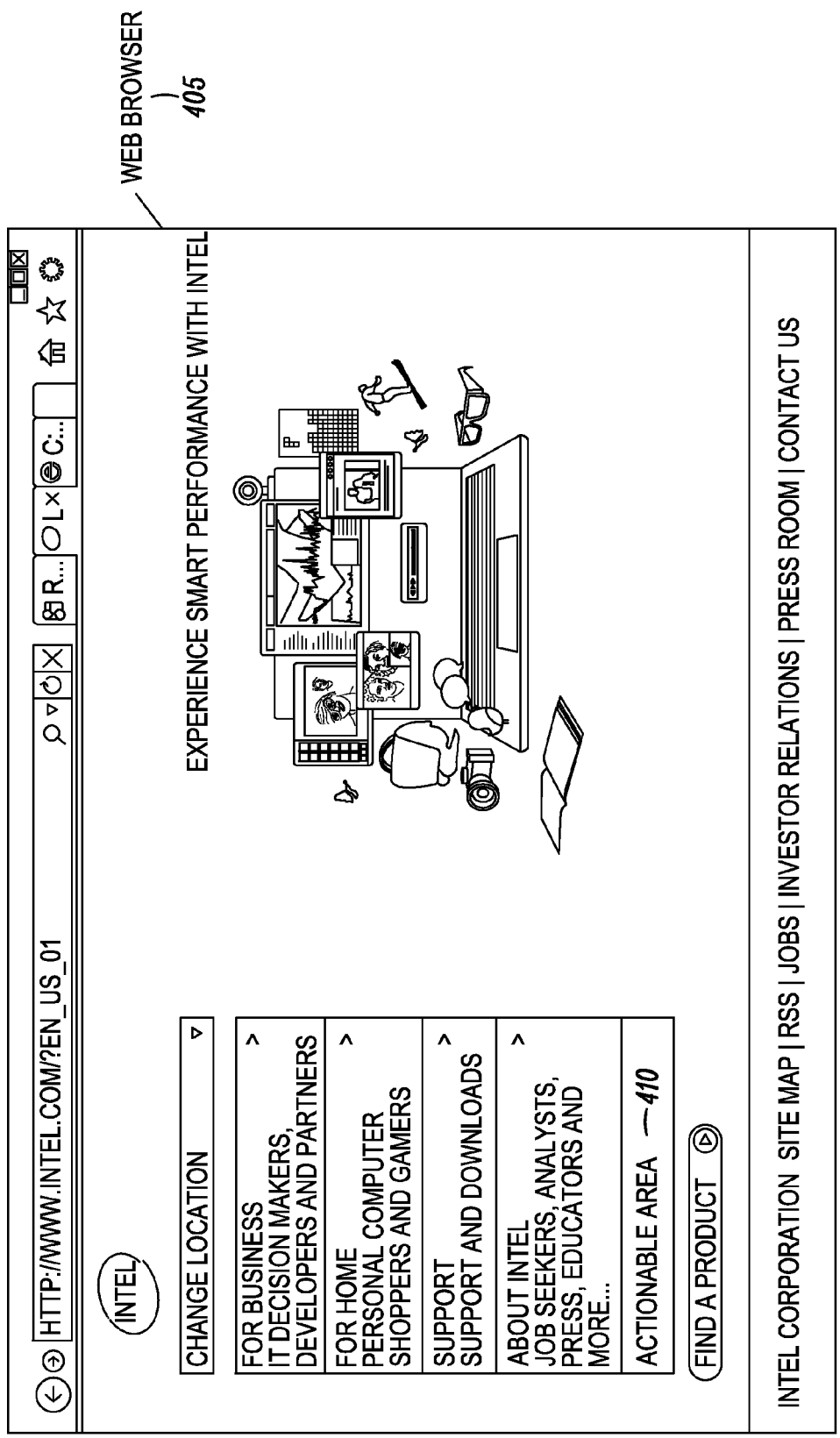
Figure 6B:
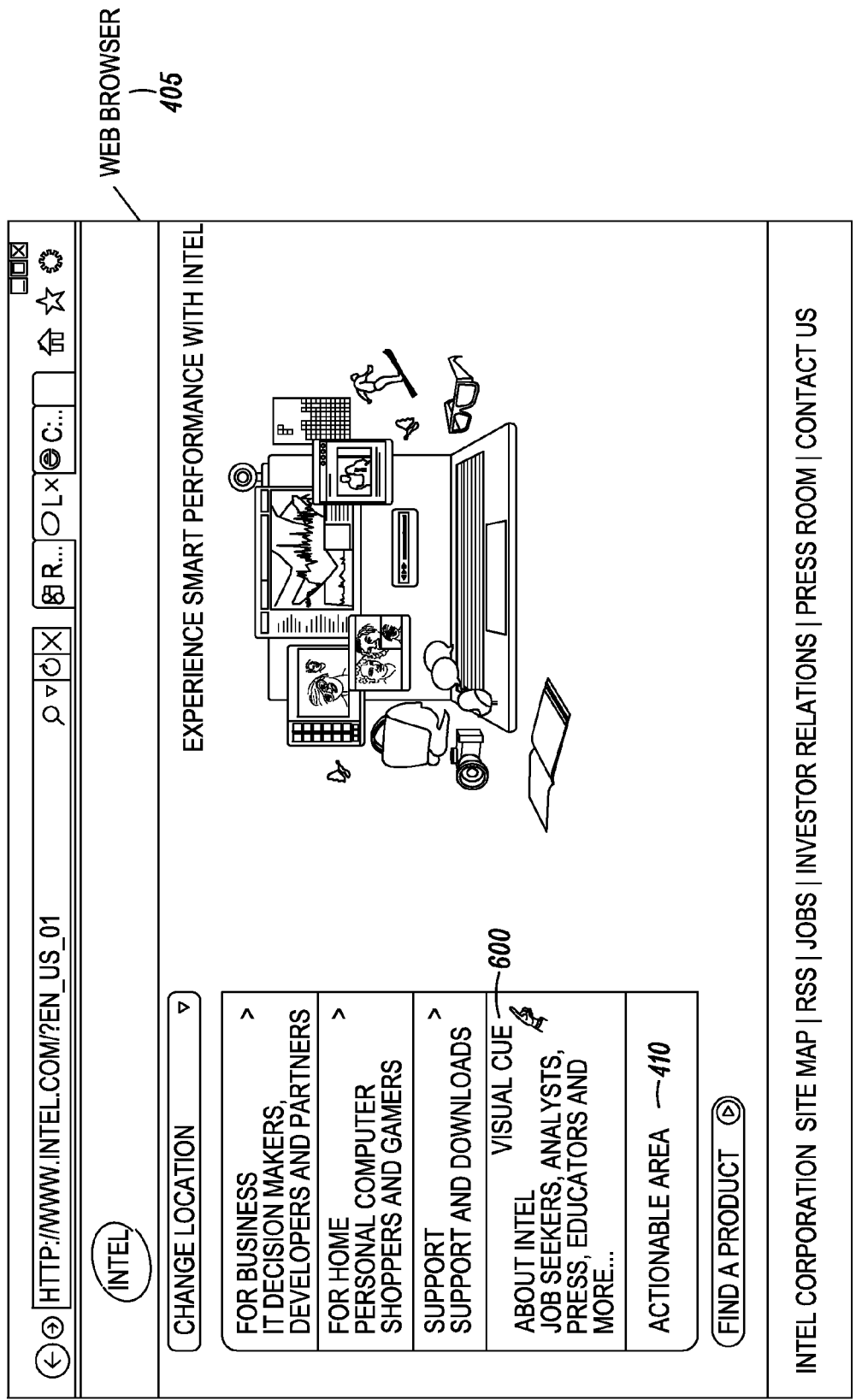
Figure 6C:
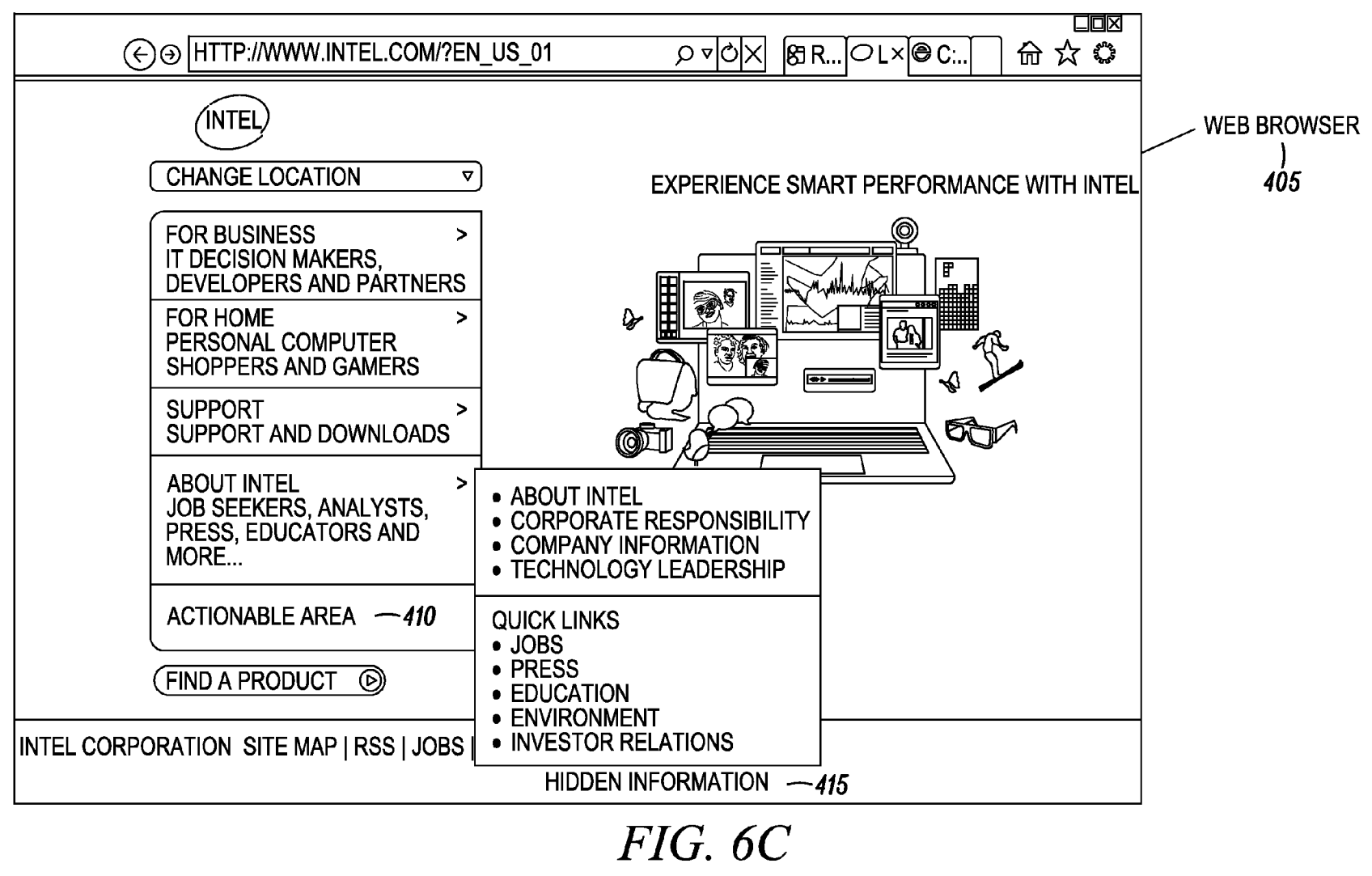

FIGS. 6A-C illustrate an embodiment of the invention. Specifically, as illustrated, going back to the example of FIG. 4 in which Actionable Area 410 is displayed on a web page within Web Browser 405. The displayed web page may be a display of a web application that runs on any platform, regardless of input devices and/or user interfaces. According to an embodiment, the displayed web page may include Actionable Area 410, which displays Hidden Information 415 when a cursor hovers over the area (illustrated in FIG. 4). Upon analysis and determination that there is an actionable area on the page, according to embodiments of the invention, a visual cue (Visual Cue 600) may appear to represent Actionable Area 400.

In the present example, Visual Cue 600 is an icon of an index finger pointing forward. As previously discussed, Visual Cue 600 may also be presented in other formats without departing from embodiments of the present invention. With the use of the gesture icon here, the user now knows that he/she can make the gesture in order to select Actionable Area 410. When a user selects the Visual Cue 600 via any input means, the action may be interpreted as a gesture from the user. Alternatively, in one embodiment, the user may make the gesture shown in the icon, and as described above, once the gesture is captured and determined to be input, the gesture may be passed on to Gesture Processing Module 120. In either scenario, the user's motion may be translates to a request to "follow link". Upon receipt of the instruction, Web Browser 130 may follow the link as illustrated in FIG. 6C, thus bringing up the entire list of items that was previously unavailable to the user's view.

Figure 7:
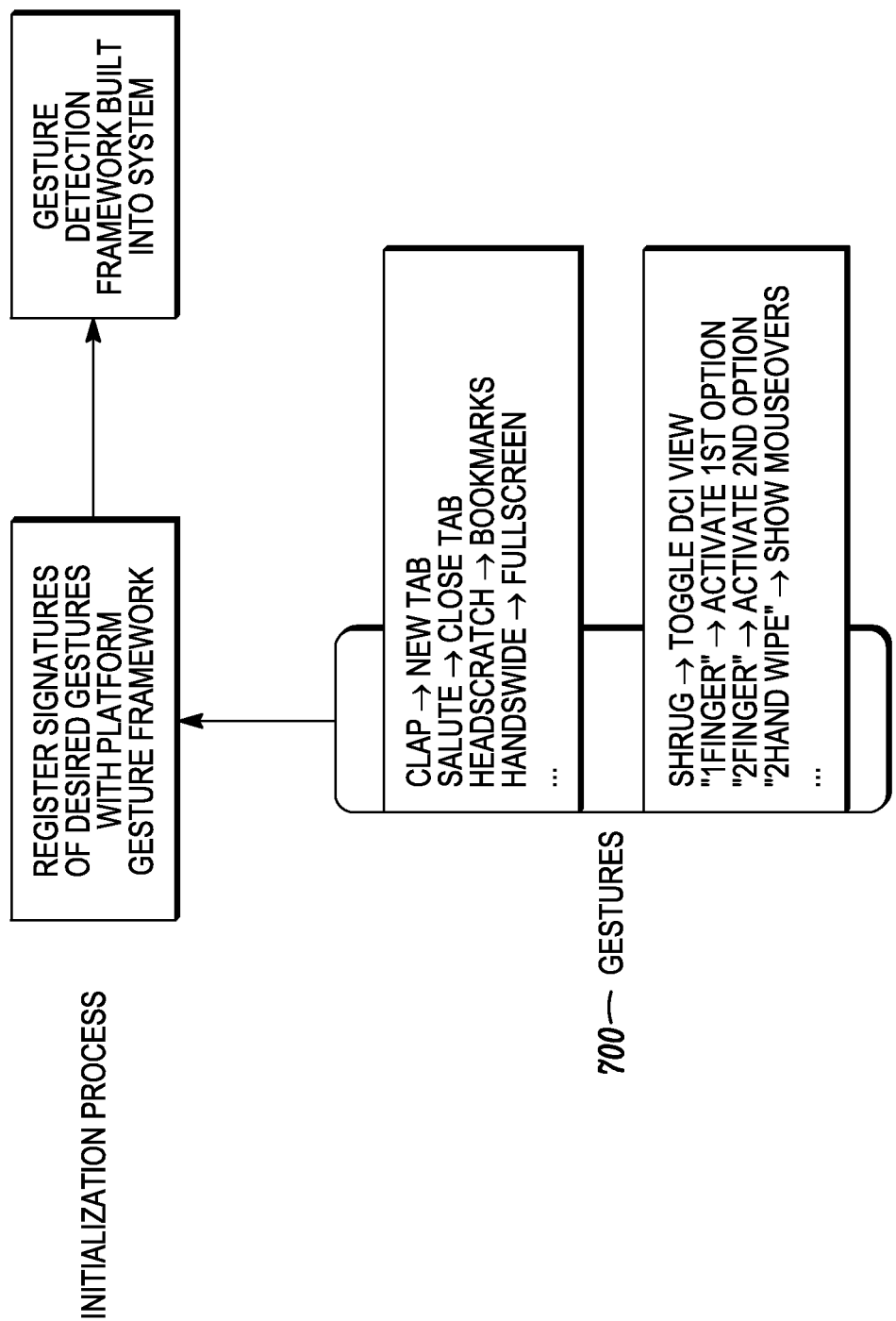
FIG. 7 illustrates an example of an initialization according to embodiments of the present invention.

FIG. 7 illustrates an initialization process according to one embodiment of the present invention. Specifically, as illustrated, a variety of gestures (browser gestures or visual cue gestures) may be registered with the platform's gesture framework. Gesture frameworks are well known to those of ordinary skill in the art and detailed description thereof is omitted herein in order not to obscure embodiments of the present invention. Once registered, these gestures may become part of the gesture recognition framework and may be accessed thereafter when the platform receives a motion that is deemed to be a gesture.

Figure 8:
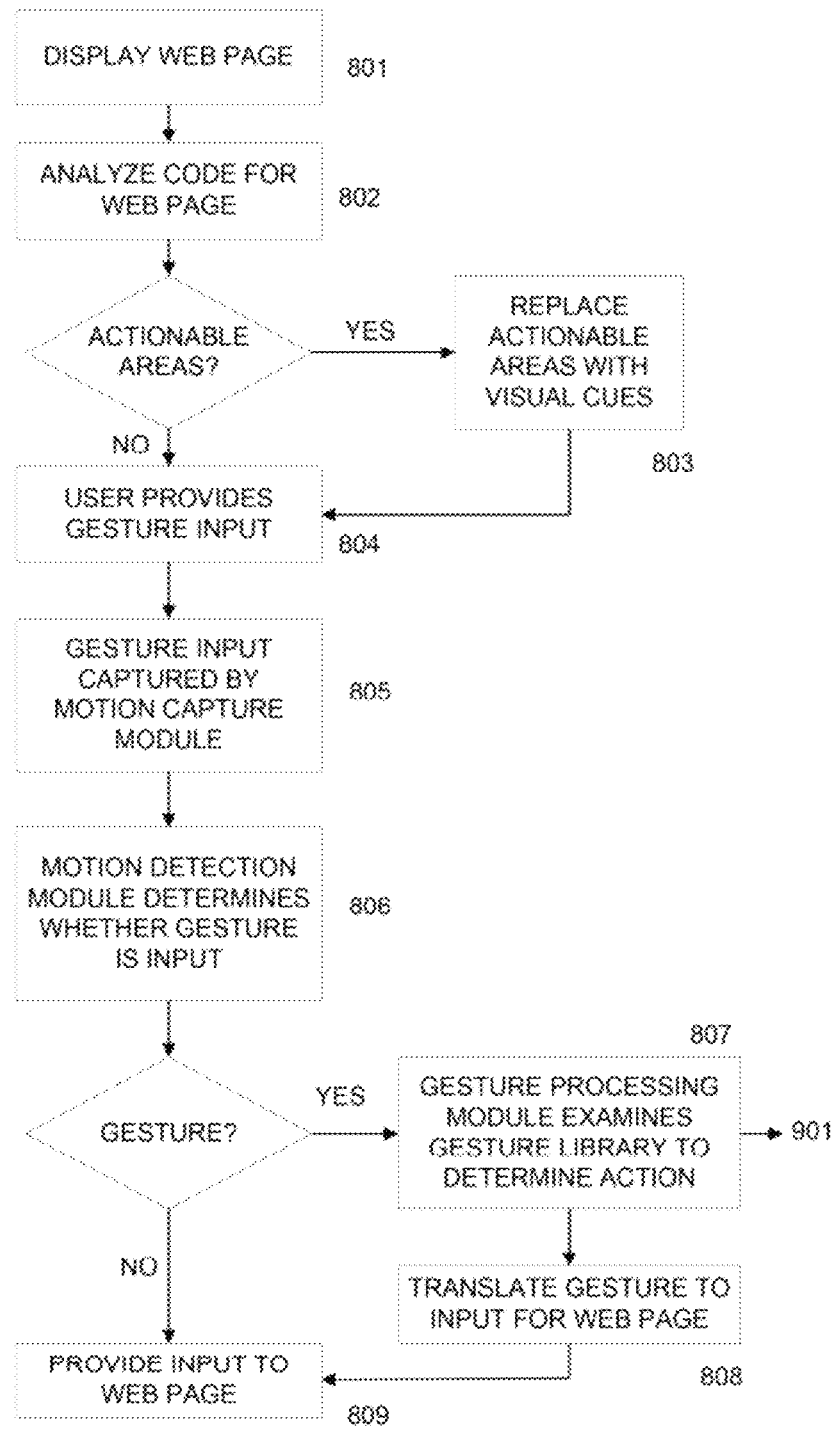
FIG. 8 is a flow chart illustrating an embodiment of the present invention.

FIG. 8 is a flow chart illustrating one embodiment of the present invention. Although the following operations may be described as a sequential process, many of the operations may in fact be performed in parallel and/or concurrently. In addition, in one or more embodiments, the order of the operations may be re-arranged without departing from the spirit of embodiments of the invention. In 701, a web page may be displayed on a device. The code for the web page may be analyzed in 702 to determine whether any actionable areas exist on the page. If they do, in 703, in one embodiment of the invention, the actionable areas may be replaced by visual cues. The user may interact with the web page by making a gesture in 704. The user's gesture may be captured by a motion capture module in 705. Once captured, the motion capture module may provide the movement to a gesture detection module in 705 to determine whether the motion is an action or is to be interpreted as input. If identified as input from the user, the gesture detection module may pass the action on to the gesture processing module in 706. The gesture detection module may examine a gesture library in 707 to determine the meaning of the user's gesture. Once the gesture is identified and translated to input for the web browser in 708, the gesture processing module may provide the input to the web browser in 709.

Figure 9:
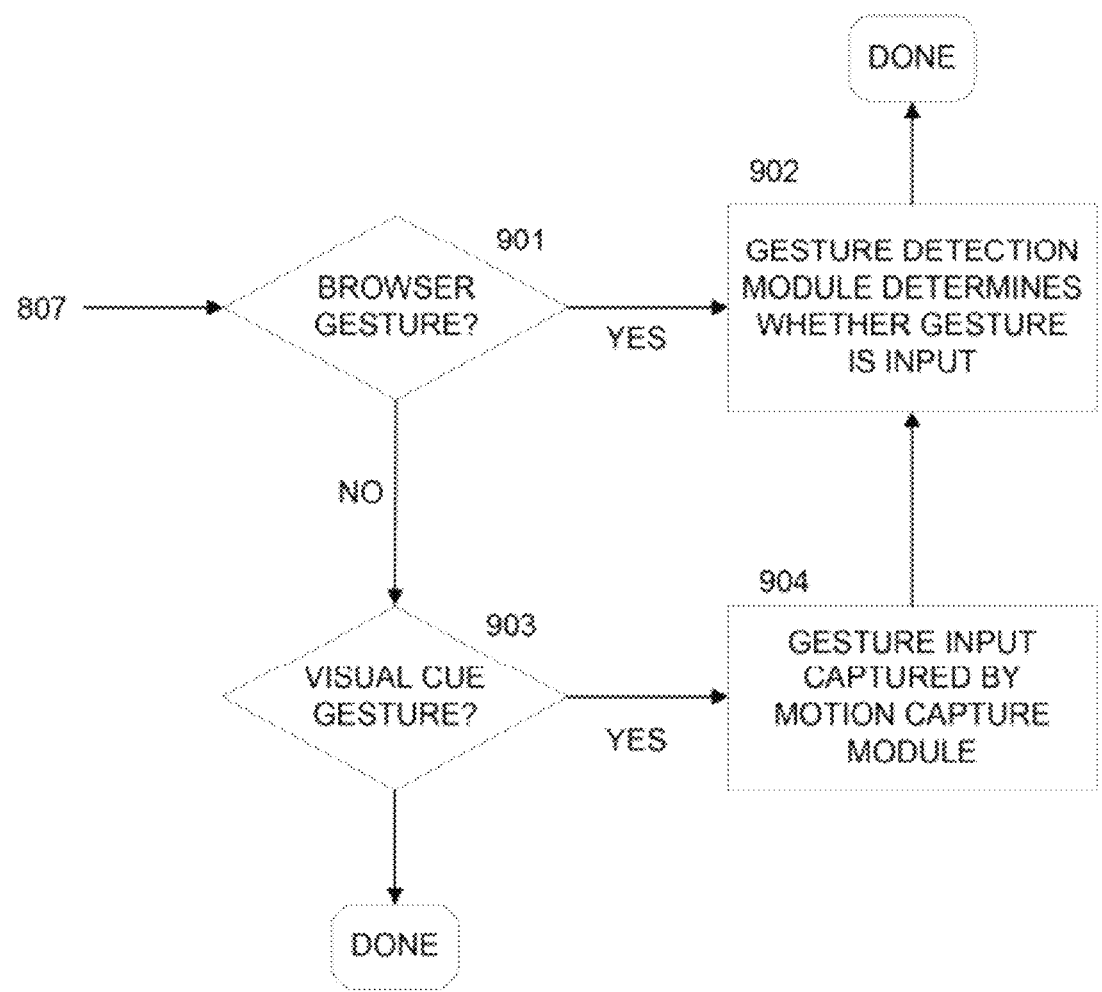
FIG. 9 is a flow chart illustrating an embodiment of the present invention.

FIG. 9 is a flow chart illustrating further how the gesture processing module examines the gesture library in step 707 above according to one embodiment of the present invention. Although the following operations may be described as a sequential process, many of the operations may in fact be performed in parallel and/or concurrently. In addition, in one or more embodiments, the order of the operations may be re-arranged without departing from the spirit of embodiments of the invention. As illustrated, gesture processing module examines the gesture library in 707 to determine an action by determining in 801 whether the browser is a browser gesture. If it is, then in 802, the motion detection module determines whether the gesture should be interpreted as input. If the gesture is not a browser gesture in 801, however, then the gesture may be examined in 803 to determine if it is a visual cue gesture that shows hidden items on a web page. Thus, for example, the gesture may be examined to determine whether it is a gesture to identify actionable areas, to select an item in an actionable area and/or to perform any other actions on the "hidden" items. If the gesture is determined to be a visual cue gesture, the gestured input may be captured by the motion capture module, then processed in 802 to determine whether the gesture is input.

Figure 10:
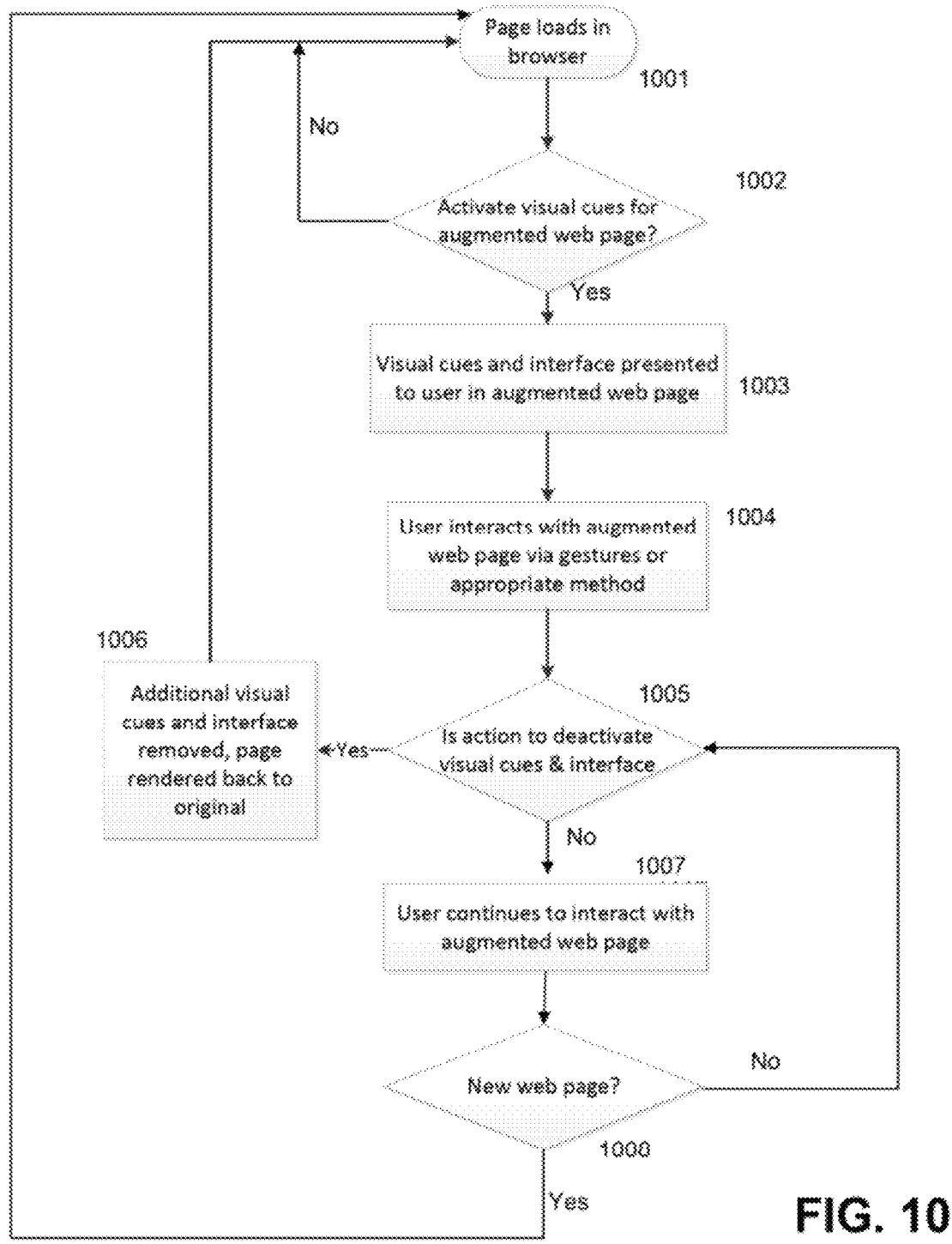
FIG. 10 is a flow chart illustrating an embodiment of the present invention.

FIG. 10 is a flow chart illustrating further visual cues may be implemented according to embodiments of the present invention. Although the following operations may be described as a sequential process, many of the operations may in fact be performed in parallel and/or concurrently. In addition, in one or more embodiments, the order of the operations may be re-arranged without departing from the spirit of embodiments of the invention. In 1001, a web browser may load a web page on a platform. According to one embodiment of the invention, if the platform is configured in 1002, in 1003 the user may be presented with the appropriate visual cues and the augmented web page. Otherwise, if the platform is not configured for visual cues, the web page may continue to be displayed without visual cues.

The user may continue to interact with the augmented web page in 1004. The user's input may be examined in 1005 to determine whether the user is attempting to deactivate the visual cues and augmented interface. If the user input is to deactivate the visual cues, in 1006, the visual cues and interface may be removed and the web page may be rendered back to the original page. If no such input is received, the user may continue to interact with the augmented web page in 1007 until a new web page is loaded in 1008.

The scheme according to embodiments of the present invention may be implemented on a variety of computing devices. According to an embodiment, a computing device may include various other well-known components such as one or more processors which can be Reduced Instruction Set Computer (RISC) engines or specialized processing engines such as Graphical Processing Units (GPUs)s, Digital Signal Processing units (DSPs) or embedded microcontrollers.

The processor(s) and machine-accessible storage media may be communicatively coupled using a bridge/memory controller, and the processor may be capable of executing instructions stored in the machine-accessible storage media. Machine-accessible storage media herein may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The bridge/memory controller may be coupled to a graphics controller, and the graphics controller may control the output of display data on a display device. The display device may include a touch-sensitive display device (also referred to herein as a "touchscreen") which may be implemented using any suitable touch-sensitive technology such as, for example and without limitation, capacitive, resistive, surface acoustic wave (SAW), infrared, and optical imaging. Touch-sensitive display device for one embodiment may be implemented using any suitable multi-touch technology. Touch-sensitive display device includes a display that may be implemented using any suitable display technology, such as that for a liquid crystal display (LCD) for example. System control logic for at least one embodiment may include one or more graphics controllers to provide one or more display interfaces to touch-sensitive display device.

The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including Ethernet, Gigabit Ethernet, PCI, PCI Express, FireWire. Bluetooth, WiFi, infrared and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method comprising:
   analyzing code for a web page to be displayed by a web browser application on a first device to identify an actionable area on the web page, the code having additional information, corresponding to the actionable area, such that if the web page is displayed with a second device, the second device different from the first device and having a positioning cursor, the additional information is displayed in response to a floatover by the positioning cursor of the second device, wherein the first device does not include a positioning cursor;
   replacing or augmenting the actionable area in the display of the web page by the web browser application on the first device with a visual cue, prior to user interaction with the displayed web page, to suggest a user gesture to effectuate selection of the actionable area;
   identifying a user motion directed at the first device;
   identifying the user motion as an input gesture;
   processing the input gesture to determine a selection of the actionable area; and
   providing the selection to the web browser application to enable the associated additional information of the selected actionable area to be displayed on the first device.

2. The method according to claim 1 wherein identifying the user motions as the input gestures comprises determining a movement associated with the input gestures.

3. The method according to claim 2 wherein processing the input gestures to determine the web browser action comprises processing the movement associated with the input gestures to determine a corresponding web browser action.

4. The method according to claim 3 wherein processing the movement associated with the user gestures comprises:
   accessing a gesture library communicatively coupled to the web browser application;
   identifying the movement within the gesture library; and
   selecting the web browser action corresponding to the identified movement within the gesture library.

5. The method of claim 1, wherein providing the selection to the web browser application to enable the associated additional information of the selected actionable area to be displayed on the first device comprises providing the selection to the web browser application to enable the associated additional information of the selected actionable area to be displayed as an overlay on the web page.

6. At least one non-transitory machine-accessible medium having stored thereon instructions that, when executed by a first machine, cause the first machine to:
   analyze code for a web page to be displayed by a web browser application operating on the first machine to identify an actionable area on the web page, the code having additional information, corresponding to the actionable area, such that if the web page is displayed with a second machine, the second machine different from the first machine and having a positioning cursor, the additional information is displayed in response to a floatover by the positioning cursor of the second machine, wherein the first machine does not include a positioning cursor;

replace or augment the actionable area in the display of the web page on the first machine with a visual cue, prior to user interaction with the displayed web page, to suggest a user gesture to effectuate selection of the actionable area;

identify a user motion directed at the first machine;

identify the user motion as an input gesture;

process the input gesture to determine a selection of the actionable area; and provide the selection to the web browser application to enable the additional information associated with the selected actionable area to be displayed on the first machine.

7. The at least one non-transitory machine-accessible medium of claim 6 further having stored thereon instructions that, when executed by the first machine, cause the first machine to identify actions corresponding to the user motions by determining a movement associated with the input gestures.

8. The at least one non-transitory machine-accessible medium of claim 7 further having stored thereon instructions that, when executed by the first machine, cause the first machine to process the input gestures to determine the web browser action by processing the movement associated with the input gestures to determine a corresponding web browser action.

9. The at least one non-transitory machine-accessible medium of claim 8 further having stored thereon instructions that, when executed by the first machine, cause the first machine to:
access a gesture library communicatively coupled to the web browser application;
identify the movement within the gesture library; and
select the web browser action corresponding to the identified movement within the gesture library.

10. The at least one non-transitory machine-accessible medium of claim 6, wherein provide the selection to the web browser application to enable the associated additional information of the selected actionable area to be displayed on the first device comprises provide the selection to the web browser application to enable the associated additional information of the selected actionable area to be displayed as an overlay on the web page.

11. A method comprising:
analyzing code for a web page to be displayed on a first computing platform to determine an actionable area on the web page, the actionable area providing additional information to a user in response to a user selection of the actionable area, wherein the code is configured such that if the web page is displayed with a second computing platform, the second computing platform different from the first computing platform and having a positioning cursor, the additional information is displayed in response to a floatover by the positioning cursor of the second computing platform, wherein the first device does not include a positioning cursor; and
replacing or augmenting the actionable area in a display of the web page on the first computing platform with a visual cue, prior to user interaction with the displayed web page, to suggest a user gesture to effectuate selection of the actionable area.

12. The method according to claim 11 wherein the visual cue comprises an icon, text or a shrunken portion of the web page.

13. The method of claim 11, wherein the first computing platform comprises a mobile device having motion sensor for identifying a user gesture to effectuate selection of the actionable area, the motion sensor comprising an accelerometer or camera.

14. At least one non-transitory machine-accessible medium having stored thereon instructions that, when executed by a machine, cause the machine to:
analyze code for a web page to be displayed on a first computing platform to determine an actionable area on the web page, the actionable area providing additional information in response to a user selection of the actionable area, wherein the code is configured such that if the web page is displayed with a second computing platform, the second computing platform different from the first computing platform and having a positioning cursor, the additional information is displayed in response to a floatover by the positioning cursor of the second computing platform, wherein the first machine does not include a positioning cursor; and
replacing or augmenting the actionable area in a display of the web page on the first computing platform with a visual cue, prior to user interaction with the displayed web page, to suggest a user gesture to effectuate selection of the actionable area.

15. The at least one non-transitory machine-accessible medium of claim 14 wherein the visual cue comprises an icon, text or a shrunken portion of the web page.

16. The at least one non-transitory machine-accessible medium of claim 14, wherein the first computing platform comprises a mobile device having a motion sensor for identifying a user gesture to effectuate selection of the actionable area, the motion sensor comprising an accelerometer or camera.

17. An apparatus, comprising:
one or more processing devices; and
at least one non-transitory machine-accessible medium having stored thereon instructions that, when executed by the one or more processing devices, cause the apparatus to:
analyze code for a web page to be displayed on the apparatus to determine an actionable area on the web page, the actionable area providing additional information to a user in response to a user selection of the actionable area, wherein the code is configured such that if the web page is displayed with a second apparatus, the second apparatus different from the apparatus and having a positioning cursor, the additional information is displayed in response to a floatover by the positioning cursor of the second apparatus, wherein the apparatus does not include a positioning cursor; and
replace or augmenting the actionable area in a display of the web page by the apparatus with a visual cue, prior to user interaction with the displayed web page, to suggest a user gesture to effectuate selection of the actionable area.

18. The apparatus of claim 17, the at least one non-transitory machine-accessible medium further having stored thereon instructions that, when executed by the one or more processing devices, cause the apparatus to:
identify a user motion directed at the apparatus;
identify the user motion as an input gesture;

process the input gesture to determine a selection of the actionable area; and in response to determining a selection of the actionable area, enable the associated additional information of the selected actionable area to be displayed as an overlay on the web page.

19. The apparatus of claim 17, wherein the additional information includes a selectable link.

* * * * *